(12) United States Patent
Hancock et al.

(10) Patent No.: US 12,545,986 B2
(45) Date of Patent: Feb. 10, 2026

(54) FREESTANDING CERAMIC TILE MANUFACTURE

(71) Applicant: ROLLS-ROYCE plc, London (GB)

(72) Inventors: Matthew Hancock, Derby (GB); Andrew Hewitt, Derby (GB)

(73) Assignee: Rolls-Royce PLC, London (GB)

( * ) Notice: Subject to any disclaimer, the term of this patent is extended or adjusted under 35 U.S.C. 154(b) by 287 days.

(21) Appl. No.: 18/509,828

(22) Filed: Nov. 15, 2023

(65) Prior Publication Data

US 2024/0183019 A1 Jun. 6, 2024

(30) Foreign Application Priority Data

Dec. 1, 2022 (GB) ...................................... 2218048

(51) Int. Cl.
  *C23C 4/18* (2006.01)
  *C23C 4/02* (2006.01)
  *C23C 4/134* (2016.01)

(52) U.S. Cl.
  CPC ................ *C23C 4/185* (2013.01); *C23C 4/02* (2013.01); *C23C 4/134* (2016.01)

(58) Field of Classification Search
  CPC .......... C23C 4/185; C23C 4/02; C23C 4/134; C23C 4/11; C23C 14/0605; C23C 14/34; B28B 1/32; B28B 7/38; B28B 11/243; C04B 35/62218; C04B 2235/6565; C04B 2235/6567; C04B 2235/95; C04B 35/64; C04B 2235/6025
  See application file for complete search history.

(56) References Cited

U.S. PATENT DOCUMENTS

| 9,404,171 B2 | 8/2016 | Hamaya et al. |
| 2002/0102409 A1* | 8/2002 | Hasz ........................ C23C 4/185 156/324 |

(Continued)

FOREIGN PATENT DOCUMENTS

| DE | 3923008 A1 | 1/1991 |
| JP | S63280631 A | 11/1988 |

(Continued)

OTHER PUBLICATIONS

Great Britain search report dated May 31, 2023, issued in GB Patent Application No. 2218048.3.

(Continued)

*Primary Examiner* — S. Behrooz Ghorishi

(57) ABSTRACT

A method of producing a freestanding ceramic tile. The method involves: grit-blasting a substrate using a grit size in the range from 36 to 220 mesh; depositing a release layer of carbon or graphite from 2 to 10 microns thick on the grit-blasted surface of the substrate; applying ceramic over the release layer until a desired thickness of ceramic is achieved to form a ceramic layer; heating the substrate, release layer, and ceramic layer to a temperature of from 800 to 1000 degrees Celsius; keeping the substrate, release layer, and ceramic layer at a temperature from 800 to 1000 degrees Celsius for a time from 10 to 20 minutes to remove the release layer; and cooling the substrate and ceramic layer at a rate of at least 200 degrees Celsius per minute, such that the ceramic layer separates from the substrate to produce a freestanding ceramic tile.

8 Claims, 2 Drawing Sheets

(56) References Cited

U.S. PATENT DOCUMENTS

| | | |
|---|---|---|
| 2005/0003172 A1 | 1/2005 | Wheeler et al. |
| 2015/0099075 A1* | 4/2015 | Hamaya .................. B22F 5/106 428/34.4 |
| 2020/0165713 A1* | 5/2020 | Venkataramani ....... C23C 4/185 |

FOREIGN PATENT DOCUMENTS

| | | |
|---|---|---|
| JP | H11165478 A | 6/1999 |
| JP | 2005112658 A2 | 4/2005 |
| JP | 6421525 B2 | 11/2018 |

OTHER PUBLICATIONS

European search report dated Apr. 3, 2024, issued in EP Patent Application No. 23207234.8.

* cited by examiner

FREESTANDING CERAMIC TILE MANUFACTURE

CROSS-REFERENCE TO RELATED APPLICATIONS

This specification is based upon and claims the benefit of priority from United Kingdom patent application number GB 2218048.3 filed on Dec. 1, 2022, the entire contents of which is incorporated herein by reference.

BACKGROUND

Technical Disclosure

The present disclosure relates to a method of producing a freestanding ceramic tile.

DESCRIPTION OF THE RELATED ART

Ceramics are often used in high temperature environments, such as gas turbine engines. Using a protective layer of ceramic material can help prevent engine components from being damaged by the extreme temperatures they are exposed to while the engine is operating. In order to test the protective qualities of a ceramic material, it is known to produce pieces of ceramic, such as ceramic tiles, which can be exposed to various simulated environments and then analysed to determine their suitability for use in such extreme environments.

There are a number of known methods for producing freestanding ceramic tiles for high temperature test work. One method is to spray salt solution on a steel substrate before drying it, then, after application of the ceramic coating, re-hydrating the salt to force the ceramic tile away from the steel. An alternative method is to spray the ceramic on to a substrate material such as aluminium, which can then be dissolved away using a strong acid or alkali material (dependant on the base alloy) over a period of time. A third method involves spraying the ceramic on to silicon mould, and a fourth method is to spray the ceramic onto a thin, unblasted metal sheet, that can then be peeled away from the ceramic tile.

However, each of the above methods has its drawbacks. Using a salt solution can be very inconsistent in terms of the ceramic adhesion and the ability to re-hydrate the salt, and therefore there is a high failure rate resulting in many broken ceramic tiles. The second method, whilst having a much lower mechanical failure rate, is extremely time consuming, and uses undesirable noxious chemicals that can contaminate the ceramic tile, meaning it cannot be used for testing. Using a silicon mould is very material dependant, with a low success rate, and if an appreciable amount of ceramic thickness is required (>1.5 mm) the residual stresses in the coating tend to make the coating curl up at the edges, meaning it is no longer flat, which in most cases is undesirable. The fourth method again suffers with the issue of residual stress in the coating resulting in wavy or curved end products.

There is therefore a need for an improved method of producing freestanding ceramic tiles or at least a useful alternative to known methods.

SUMMARY

According to a first aspect there is provided a method of producing a freestanding ceramic tile, the method comprising: grit-blasting a substrate using a grit size in the range from 36 mesh to 220 mesh; depositing a release layer on the grit-blasted surface of the substrate, wherein the release layer is a layer of carbon or a layer of graphite, the release layer being from 2 to 10 microns thick; applying ceramic over the release layer until a desired thickness of ceramic is achieved to form a ceramic layer; heating the substrate and ceramic layer to a temperature of from 800 to 1000 degrees Celsius; keeping the substrate and ceramic layer at a temperature from 800 to 1000 degrees Celsius for a time from 10 to 20 minutes; and cooling the substrate and ceramic layer via quenching at a rate of at least 200 degrees Celsius (392 degrees Fahrenheit) per minute, such that the ceramic layer separates from the substrate to form a freestanding ceramic tile.

This method has been found to repeatedly produce flat, free-standing ceramic tiles with a very low failure rate. It does not require the use of any noxious substances, and is faster than other known methods for producing ceramic tiles. In particular, the use of a carbon or graphite release layer is advantageous as carbon and graphite both allow some movement of the ceramic to accommodate stresses arising during the ceramic deposition process, but without allowing it to curl, thus reducing the failure rate compared to other known processes.

The substrate can comprise nickel or stainless steel. Nickel and stainless steel do not react with ceramic and are stable at elevated temperatures.

The grit can comprise one or more of alumina, metal shot, sand, or solid $CO_2$. Such materials are not noxious, are capable of imprinting on the substrate, and are readily available.

The release layer can be applied using vacuum sputtering or physical abrasion. Such methods are suitable for creating thin and even layers upon the substrate.

The ceramic can be applied over the release layer by plasma spraying. Plasma spraying allows for a high rate of ceramic deposition.

The thickness of the ceramic layer can be 1.5 mm or more. Ceramic tiles with thicknesses of 1.5 mm or more are desirable for freestanding test applications.

The substrate can be heated using an air furnace. Air furnaces provide a means for evenly heating the substrate.

The substrate can be quenched using cold air or water. Both methods are cheap, effective, and readily available.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

Figure 1:
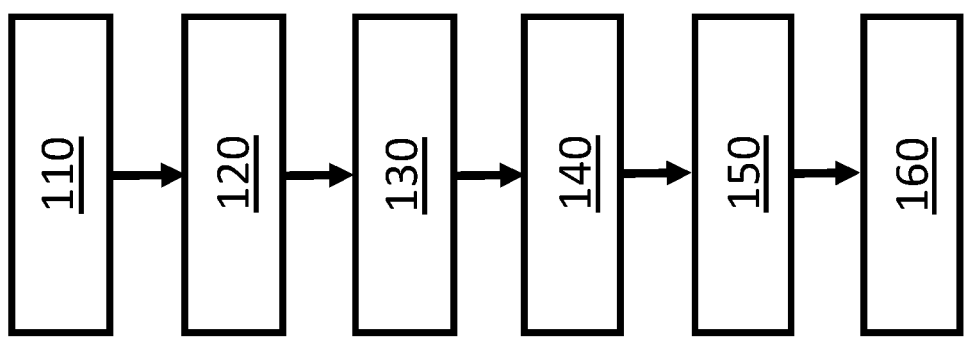
FIG. 1 is a flow chart illustrating the method of the present disclosure.
Figure 1:
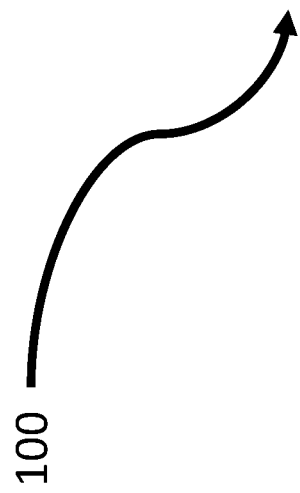

The following table lists the reference numerals used in the drawings with the features to which they refer:

| Ref no. | Feature | FIG. |
|---|---|---|
| 100 | Method | 1 |
| 110 | First step | 1 |
| 120 | Second step | 1 |
| 130 | Third step | 1 |
| 140 | Fourth step | 1 |
| 150 | Fifth step | 1 |
| 160 | Sixth step | 1 |
| 200 | Substrate | 2 |
| 210 | Release layer | 2 |
| 220 | Ceramic layer | 2 |

DETAILED DESCRIPTION

Aspects and embodiments of the present disclosure will now be discussed with reference to the accompanying figures. Further aspects and embodiments will be apparent to those skilled in the art.

Figure 2:
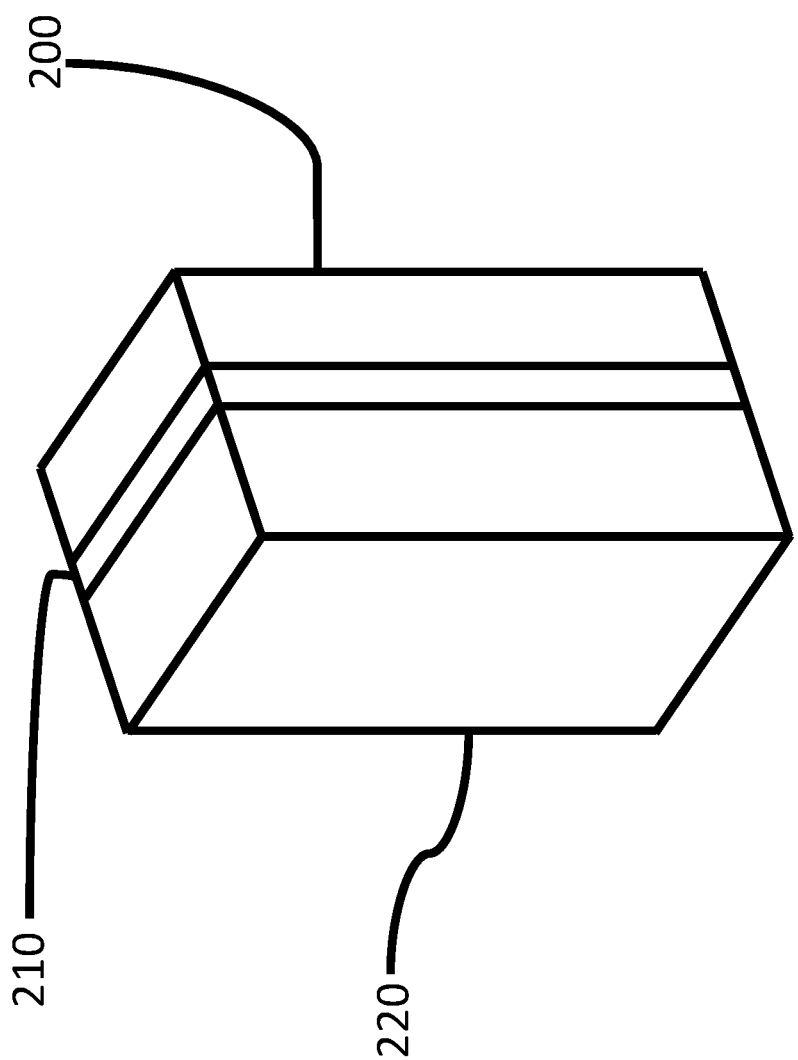
FIG. 2 shows an isometric view of a release layer sandwiched between a substrate and a layer of ceramic.

FIG. 1 shows a flow chart for a method 100 according to the present disclosure. At the first step 110, a substrate 200 (see FIG. 2) is grit-blasted using a grit size in the range from 36 mesh to 220 mesh. In this example the substrate comprises stainless steel, and the grit consists of alumina, but the skilled person will appreciate other substrate materials, such as nickel, and other grit materials, such as Alumina, metal shot, sand, or solid $CO_2$, can be used. The purpose of the grit blasting is to both clean and abrade the surface of the substrate, so that further layers deposited upon the substrate will stick to it.

The second step 120 in the process is to deposit a release layer 210 (see FIG. 2) on to the grit-blasted surface of the substrate 200. The release layer can consist of carbon or graphite. The deposition of the release layer 210 can be achieved by any process suitable for creating an even, thin layer from 2 to 10 microns thick across the entirety of the substrate surface; for example vacuum sputtering, or physical abrasion using a carbon or graphite block.

In the third step 130, the ceramic layer 220 (see FIG. 2) is applied to the release layer until the desired thickness for the eventual freestanding tile (typically greater than 1.5 mm) is achieved. In this example the ceramic layer is applied using a standard air plasma spraying process, but the skilled person will appreciate any suitable method may be used. If using such a spraying process, it is important the substrate is mounted such that there is no shadowing of the substrate (i.e. that the path from the source of the spray to the substrate surface is not blocked at any point), as this will lead to uneven distribution of the ceramic, meaning be the ceramic tile created is ultimately unusable. Magnetic mounting of the substrate is one way to mount the substrate such that its surface is completely unobstructed with respect to the ceramic spray, but the skilled person will appreciate there are other ways to achieve the same result.

In a fourth step 140, the substrate 200 (and therefore the release layer 210 and ceramic layer 220) is heated to a temperature from 800 to 1000 degrees Celsius (1472 to 1832 degrees Fahrenheit). This can be achieved by placing the substrate into an air furnace for example, although the skilled person will appreciate alternative heating means could be used to heat the substrate.

In a fifth step 150, the substrate is held at a temperature from 800 to 1000 degrees Celsius for a period of time equalling from 10 to 20 minutes. By holding the carbon or graphite layer in the temperature range of from 800 to 1000 degrees Celsius for a period of time equalling from 10 to 20 minutes, the carbon or graphite layer will burn out, owing to the fact that carbon and graphite oxidise within this temperature range.

In the sixth and final step 160, the substrate is quenched to bring it rapidly back down to room temperature. In this context, "rapidly" equates to a cooling rate of at least 200 degrees Celsius (or 392 degrees Fahrenheit) per minute. This can be achieved using air or water that has been cooled, or other suitable means as will be familiar to the skilled person. The ceramic layer will separate from the substrate during the quenching process, due to the carbon or graphite release layer having been burnt out during the previous step of the method.

This method has been found to repeatedly produce flat, free-standing ceramic tiles with a very low failure rate. It also does not require the use of any noxious substances, and is faster than other known methods for producing ceramic tiles. In particular, the use of a carbon or graphite release layer is advantageous as carbon and graphite both allow some movement of the ceramic to accommodate stresses arising during the ceramic deposition process, reducing the failure rate compared to other known process where the ceramic layer curls away from the substrate, leading to curved or broken tiles unsuitable for use in testing.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of producing a freestanding ceramic tile, the method comprising the steps of:
    grit-blasting a substrate using a grit size in the range from 36 mesh to 220 mesh;
    depositing a release layer on the grit-blasted surface of the substrate, wherein the release layer is a layer of carbon or a layer of graphite, the release layer being from 2 to 10 microns thick;
    applying ceramic over the release layer until a desired thickness of ceramic is achieved to form a ceramic layer;
    heating the substrate, release layer, and ceramic layer to a temperature of from 800 to 1000 degrees Celsius;
    keeping the substrate, release layer, and ceramic layer at a temperature from 800 to 1000 degrees Celsius for a time from 10 to 20 minutes to remove the release layer; and
    cooling the substrate and ceramic layer via quenching at a rate of at least 200 degrees Celsius per minute, such that the ceramic layer separates from the substrate to produce a freestanding ceramic tile.

2. The method of claim 1, wherein the substrate comprises at least one selected from the list of nickel and stainless steel.

3. The method of claim 1, wherein the grit comprises one or more of alumina, metal shot, sand, or solid $CO_2$.

4. The method of claim 1, wherein the release layer is applied using vacuum sputtering or physical abrasion.

5. The method of claim 1, wherein the ceramic is applied over the release layer by plasma spray.

6. The method of claim 1, wherein the thickness of the ceramic layer is 1.5 mm or more.

7. The method of claim 1, wherein the substrate is heated using an air furnace.

8. The method of claim 1, wherein the substrate is quenched using at least one selected from the list of air, and water.

* * * * *